US011650294B2

(12) United States Patent
Mourujarvi

(10) Patent No.: US 11,650,294 B2
(45) Date of Patent: May 16, 2023

(54) FABRY-PÉROT ELEMENT IN LIDAR DEVICE

(71) Applicant: MURATA MANUFACTURING CO., LTD., Nagaokakyo (JP)

(72) Inventor: Risto Mourujarvi, Perttula (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1024 days.

(21) Appl. No.: 16/361,860

(22) Filed: Mar. 22, 2019

(65) Prior Publication Data

US 2019/0302238 A1 Oct. 3, 2019

(30) Foreign Application Priority Data

Mar. 28, 2018 (FI) .................................... 20185289

(51) Int. Cl.
*G01S 7/481* (2006.01)
*G01S 7/4912* (2020.01)
(Continued)

(52) U.S. Cl.
CPC .......... *G01S 7/4817* (2013.01); *G01S 7/4868* (2013.01); *G01S 7/4918* (2013.01); *H01S 3/105* (2013.01)

(58) Field of Classification Search
CPC .... G01S 7/4817; G01S 7/4868; G01S 7/4918; G01S 7/4816; G01S 7/497; G01S 17/08; H01S 3/105
See application file for complete search history.

(56) References Cited

U.S. PATENT DOCUMENTS

| 5,214,484 A | 5/1993 | de Mollerat du Jeu |
| 2016/0011312 A1 | 1/2016 | Leyva |

(Continued)

FOREIGN PATENT DOCUMENTS

| CN | 105974432 A | | 9/2016 |
| JP | 2007085832 A | * | 4/2007 |

(Continued)

OTHER PUBLICATIONS

JP-2007085832-A (Year: 2007).*
Finnish Search Report dated Oct. 26, 2018 corresponding to Finnish Patent Application No. 20185289.

Primary Examiner — Isam A Alsomiri
Assistant Examiner — Sanjida Naser
(74) Attorney, Agent, or Firm — Squire Patton Boggs (US) LLP

(57) ABSTRACT

A measurement arrangement for measuring the travel time of a laser beam, comprising a laser device configured to emit laser light with a laser wavelength toward the surrounding environment and one or more light detectors configured to absorb inbound laser light after it has been reflected back towards the measurement arrangement. The measurement arrangement also comprises an order-sorting filter configured to transmit laser light only in a first wavelength range, and a scanning Fabry-Pérot interferometer configured to transmit laser light only in a cavity resonance wavelength range. The first wavelength range is broader than the cavity resonance wavelength range, and a control unit is configured to shift the center of the cavity resonance wavelength range when the temperature of the laser device changes.

11 Claims, 4 Drawing Sheets

(51) Int. Cl.
    *G01S 7/486*     (2020.01)
    *H01S 3/105*     (2006.01)

(56) References Cited

U.S. PATENT DOCUMENTS

| | | |
|---|---|---|
| 2017/0090031 A1 | 3/2017 | Bondy et al. |
| 2017/0350982 A1 | 12/2017 | Lipson |
| 2018/0069367 A1* | 3/2018 | Villeneuve .......... H01S 3/08086 |
| 2018/0081045 A1* | 3/2018 | Gylys .................. G01S 7/487 |

FOREIGN PATENT DOCUMENTS

| | | |
|---|---|---|
| JP | 2007085832 A | 4/2007 |
| JP | 2013-011511 A | 1/2013 |
| JP | 2016031236 A | 3/2016 |
| WO | WO 2018/081045 A1 | 5/2018 |

\* cited by examiner

FABRY-PÉROT ELEMENT IN LIDAR DEVICE

FIELD OF THE DISCLOSURE

The present disclosure relates to travel time measurements for laser light emitted into the surroundings of the laser device. More particularly, the disclosure relates to laser devices which can be configured to map their surroundings with repeated travel time measurements, such as light-detection-and-ranging (LIDAR) devices. The present disclosure further concerns the signal-to-noise ratio in travel time measurement conducted in ambient conditions, and means for improving that ratio.

BACKGROUND OF THE DISCLOSURE

Light-detection-and-ranging (LIDAR) systems typically comprise a laser device which emits a sequence of laser beam pulses or modulated continuous-wave laser light to the surrounding environment, and a light detector which retrieves inbound light after it has been reflected from nearby objects. LIDAR systems may also comprise a reflector for reflecting outbound laser light in different directions, and also a reflector for reflecting inbound laser light towards the light detector. The reflector may be a microelectromechanically driven MEMS reflector. In coaxial systems, the axis of the laser beam is coincident with the axis of the receiver optics. In biaxial arrangements, the laser beam and the receiver axis are separated, and the laser beam only enters the field of view of the receiver optics beyond some predetermined range.

By measuring the time lapse between emission and detection for light reflected in different directions, or the time-dependent phase-shift of the continuous-wave, the LIDAR system can calculate and analyse distance-related data related to its surrounding environment.

Certain restrictions are imposed on travel time laser measurements when they are conducted in the ambient environment where people may be present. Firstly, the laser light must have a relatively low intensity for eye-safety reasons. Secondly, sunlight and light from external light sources such as car headlights will also enter the LIDAR systems and influence the measurement performed at the light detector. These factors influence the signal-to-noise ratio of LIDAR systems and limit their resolution and range.

Document US2017350982 discloses a LIDAR system where static band-pass filters are used on the light path of inbound laser light to improve the signal-to-noise ratio by filtering ambient light.

However, a general problem with static band-pass filters is that they must allow a relatively broad range of wavelengths to pass through to the detector. This is because the wavelength of the emitted laser light typically depends on the temperature of the laser device, and because the wavelength may exhibit drift over long time periods. Especially when the laser device is used outdoors, where weather conditions vary and give rise to ageing effects, the wavelength of the emitted laser light cannot be expected to remain constant over long periods of time. This must be taken into account in the design of the band-pass filter by giving the band-pass filter a pass band which is much broader than the FWHM pass band of the laser device. Therefore, although the signal-to-noise ratio of the light detector is improved by the use of static band-pass filters, it remains far from ideal.

BRIEF DESCRIPTION OF THE DISCLOSURE

An object of the present disclosure is to provide an apparatus and a method to alleviate the disadvantage discussed above.

The object of the disclosure is achieved by an apparatus and a method which are characterized by what is stated in the independent claims. The preferred embodiments of the disclosure are disclosed in the dependent claims.

The disclosure is based on the idea of utilizing a scanning Fabry-Pérot interferometer on the light path of inbound laser light, and adjusting the pass band of this interferometer dynamically if the wavelength of emitted laser light changes.

An advantage of the method and arrangement described in this disclosure is that the narrow pass band of the Fabry-Pérot interferometer is continuously adjusted to coincide with the wavelength of emitted laser light. The amount of ambient light which enters the light detector is reduced, and the signal-to-noise ratio of the travel time measurement is improved.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
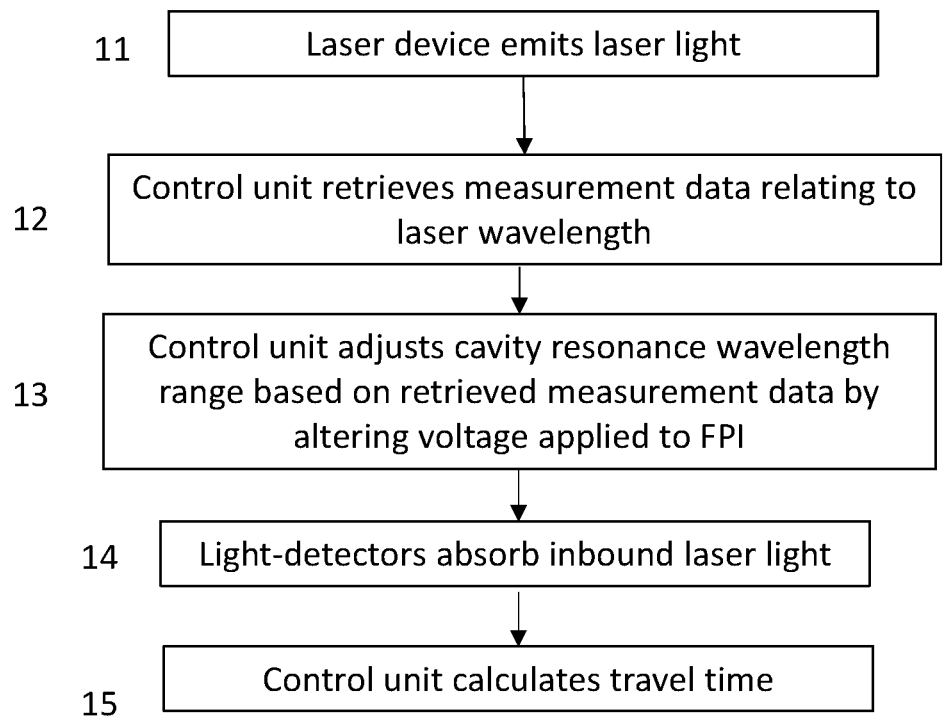
FIG. 1 illustrates a measurement method.

This disclosure describes a measurement arrangement for measuring the travel time of a laser beam. The arrangement comprises a laser device configured to emit laser light with a laser wavelength toward the surrounding environment, and one or more light detectors configured to absorb inbound laser light after it has been reflected back towards the measurement arrangement from an object in the surrounding environment. The measurement arrangement also comprises a control unit configured to calculate the travel time either by recording the emission time of sequential laser pulses at the laser device and the absorption time of each laser pulse at the one or more light detectors, or by determining the phase-shift of continuous-wave laser light between emission and absorption.

The measurement arrangement also comprises, on the light path from the object in the surrounding environment to the one or more light detectors, an order-sorting filter configured to transmit laser light only in a first wavelength range, and a scanning Fabry-Pérot interferometer configured to transmit laser light only in a cavity resonance wavelength range, wherein the first wavelength range is broader than the cavity resonance wavelength range. The measurement arrangement also comprises a voltage source connected to the scanning Fabry-Pérot interferometer, so that the cavity resonance wavelength range can be changed by altering the voltage applied to the scanning Fabry-Pérot interferometer. The control unit is configured to retrieve measurement data relating to the laser wavelength from a sensor, and to shift the center of the cavity resonance wavelength range based on the retrieved measurement data by altering the voltage applied to the scanning Fabry-Pérot interferometer.

The laser device may be a pulsed laser device, or a laser device which emits laser light continuously. If the device is pulsed, the laser light is a pulsed laser beam, i.e. a sequence of laser pulses. The pulse frequency of a pulsed laser device may for example be 50 kHz-200 kHz, so that an emitted pulse typically returns to the LIDAR system before the next one is emitted. In this case the control unit may be configured to calculate the travel time by recording the emission time of sequential laser pulses at the laser device and the absorption time of each laser pulse at the one or more light detectors.

If the laser device emits light continuously, the laser light may be a continuous-wave laser beam where the intensity amplitude of the laser light is modulated. In this case the control unit may be configured to calculate the travel time by determining the phase-shift of the continuous-wave laser light between emission and absorption by demodulating the light signal.

In both cases, the magnitude of the arriving laser light (the intensity of an arriving pulse or the amplitude of an arriving continuous wave) may be measured at the same time as the travel time measurements are performed.

The laser device may for example be a laser diode. The full-width-at-half-maximum (FWHM) value for the emission peak of a laser diode is typically on the order of a few nanometers. The wavelength of the emitted laser radiation may be in the near infrared region, for example in the range 800 nm-1600 nm.

The laser device may be a single laser unit or a laser array module which contains multiple laser units. Each laser unit in the array may be a pulsed laser unit, or each unit in the laser array may be a laser which emits amplitude-modulated laser light continuously.

The usage temperatures of LIDAR systems depend on the application. Laser devices may, for example, experience temperature variations in the range −40° C.-+125° C. in automobile applications A method performed with the measurement arrangement is illustrated in FIG. 1. The laser device emits laser light with a laser wavelength toward the surrounding environment (11), the control unit retrieves measurement data relating to the laser wavelength from a sensor (12) and shifts the cavity resonance wavelength range based on the retrieved measurement data by altering the voltage applied to the scanning Fabry-Pérot interferometer (13). The one or more light detectors absorb inbound laser (14), and the control unit calculates the travel time in the manner described above (15).

In this disclosure, the terms "emission time" and "absorption time" refer to timestamps recorded when the emission/absorption of a laser pulse occurred. The travel time is the difference between the absorption time and the emission time.

The laser light emitted from the laser device may strike a first reflector which reflects them toward the scanning environment. The reflector may be a scanning reflector which can be tilted in different directions. Alternatively, the laser light may proceed directly towards the scanning environment from the laser device.

Figure 2:
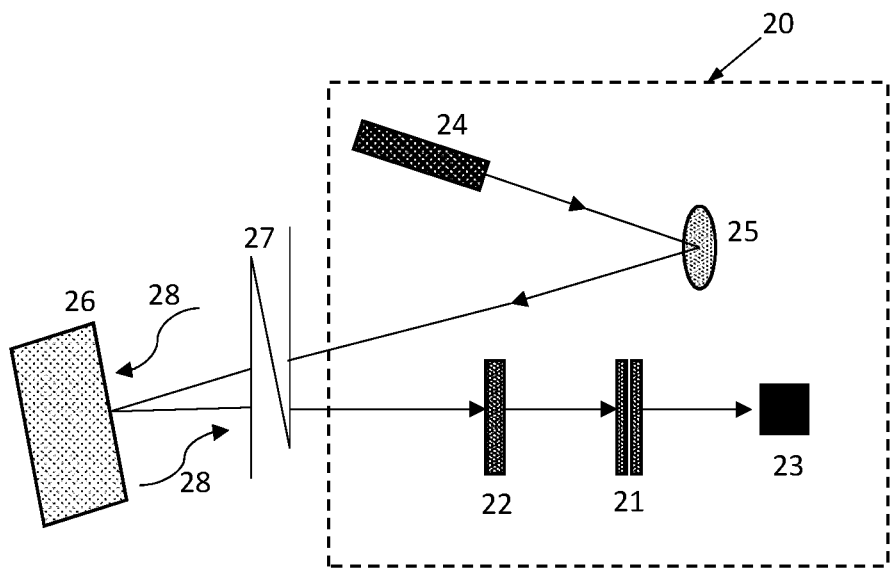
FIG. 2 illustrates a measurement arrangement.

FIG. 2 illustrates a measurement arrangement 20 according to the present disclosure. The arrangement comprises a laser device 24 which is configured to emit laser light, and an optional first scanning reflector 25 which reflects the light out towards the surrounding environment 27. The reflector 25 may be a MEMS reflector which is driven to oscillate in resonance by capacitive, piezoelectric or electromagnetic actuators. The laser light may also be reflected by other reflectors before they exit the measurement arrangement 20. If the laser device is arranged in such a way that it can emit light directly towards the surrounding environment, the scanning reflector and other reflectors may in some cases be omitted.

Laser light traverses the surrounding environment 27 around the measurement arrangement 20 and eventually strikes an object 26. At least some of the laser light is reflected back towards the measurement arrangement along a light path from the object 26 to a light detector 23. This light path may also include one or more additional reflectors, which are not illustrated in FIG. 2. FIG. 2 illustrates a biaxial case, where the inbound light path does not coincide with the outbound light path. The measurement arrangement described in this disclosure may alternatively be coaxial, so that the outbound light path coincides with the inbound light path. In other words, the light path from the object 26 to the one or more light detectors 23 may also comprise reflection at the first scanning reflector 25.

In the surrounding environment 27, ambient light 28 such as sunlight and light from other sources in the surrounding environment may also enter the 26-23 light path after it has been reflected from the object 26 or from some other object. As explained above, this ambient light makes it more difficult to accurately detect the laser light at the light detector 23.

The measurement arrangement comprises an order-sorting filter 22 on the light path from the object 26 to the light detector 23, which prevents the side bands of the Fabry-Pérot interferometer from influencing the measurement. The order sorting filter may, for example, be a passive band-pass or high-pass optical filter with a broad pass band which may be hundreds of nanometers wide. The measurement arrangement also comprises a Fabry-Pérot interferometer 21 on the 26-23 light path before or after the order sorting filter.

The Fabry-Pérot interferometer (FPI) is an optical filter that consists of two flat and highly reflective parallel planes spaced a well-defined distance apart. The space between the reflective plane surfaces is essentially a resonance cavity that defines the optical filter pass band wavelength. The FPI may be a scanning FPI, where the distance between the two reflecting surfaces of the FPI can be altered by changing the voltage applied to the voltage terminals that control the distance between the reflective surfaces. The control unit may be configured to control the scanning FPI through a voltage source, which has not been illustrated in FIG. 2.

Figure 3A:
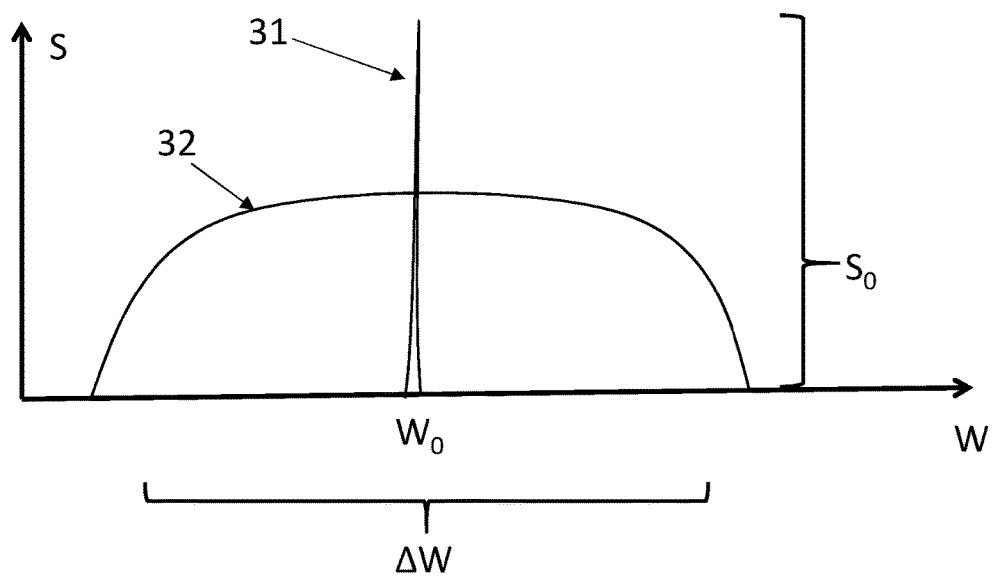
FIGS. 3a and 3b illustrates the operation principle.
Figure 3B:
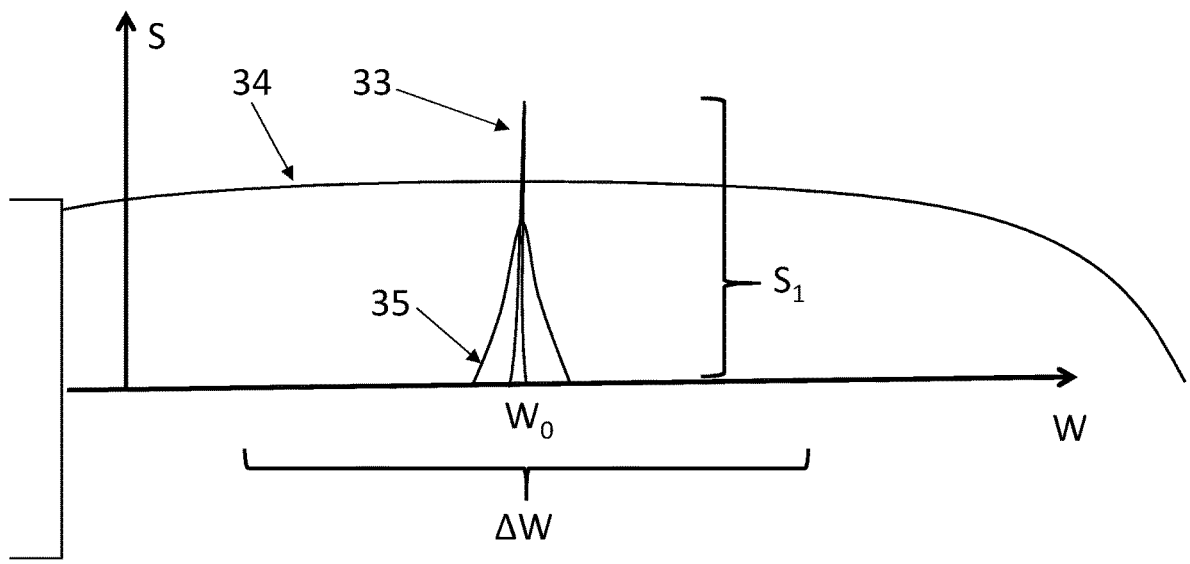

FIGS. 3a and 3b illustrate the operation principle of the arrangement and the method described in this disclosure. The W-axis represents wavelength and the S-axis represents a signal value measured by a light detector. FIG. 3a illustrates an arrangement where only a static pass-band filter, and no FPI, is used for filtering the incoming light. 31 is a laser peak emitted at the laser wavelength $W_0$, with a height $S_0$. $W_0$ may, for example, be 950 nm or 1550 nm. $W_0$ may lie in the near-infrared region.

The curve 32 shows the pass-band of the static filter. The drift interval of the laser wavelength in the laser device (typically caused by temperature variation or ageing) is illustrated by $\Delta W$. In order to ensure that the measurement can be conducted at all temperatures, the pass band 32 of the static filter must encompass the laser wavelength drift interval $\Delta W$ of the laser device. Within the temperature range mentioned above, $\Delta W$ may be about 50 nm for a typical laser device without temperature adjustment. The signal-to-noise ratio will be comparatively low due to noise from incoming photons within the pass band 32 which do not originate from the laser device.

FIG. 3b illustrates the characteristics of the same measurement when an order-sorting filter and a Fabry-Pérot interferometer is used. 33 is a laser peak emitted at the laser wavelength $W_0$, with a height $S_1$. The curve 34 shows the pass-band of the order-sorting filter, which defines the first wavelength range. It should be sufficiently narrow to block the wavelengths which would pass through the FPI after the reflection of unwanted harmonics, but in practice this means that it can be hundreds of nanometers wide, far wider than the drift interval $\Delta W$ of the laser wavelength. The curve 35, on the other hand, illustrates the cavity resonance wavelength range which is determined by the FPI. This cavity resonance wavelength range can be much narrower than the drift interval $\Delta W$ because the scanning FPI can track changes in the laser wavelength $W_0$ in the manner described in the embodiments presented below. Consequently, the signal-to-noise ratio of the light arriving at the detector is in this case determined by the curves 33 and 35, and it will comparatively high due to the narrowness of the cavity resonance wavelength range.

The width of the cavity resonance wavelength range is characterized by the FWHM value of the curve 35 which may, for example, be in the range 1-20 nm, 3-15 nm or 5-10 nm.

The control unit may retrieve measurement data relating to the laser wavelength, and particularly to changes in the laser wavelength, from a sensor. The sensor may be a temperature sensor configured to measure the temperature of the laser device 24. Alternatively, the sensor may be one of the one or more light detectors. The sensor may be light detector 23, or a separate light detector adjacent to light detector 23, which is specifically dedicated to collecting data for FPI adjustments.

If the sensor for measuring data relating to laser wavelength is a light detector, the measurements needed for shifting the center of the cavity resonance wavelength range does not have to be conducted on light which is reflected back from the surrounding environment (although it can be conducted on such light). When laser light emitted from the laser device, the immediate surroundings (typically inside a casing if some kind) of the laser device are typically strongly illuminated by reflected and scattered light. Only the wavelength of the laser light is of interest, and a suitably placed light detector can detect the wavelength from any part of this reflected and scattered light. Reflection toward the light detector may optionally be assisted with additional mirrors. Furthermore, the laser beam emitted from the laser device may also pass through a beam splitter before it is directed outward, and one part of the split laser beam may be directed toward a light detector for the laser wavelength measurement.

The following embodiments will describe how the control unit may shift the center of the cavity resonance wavelength range based on the measurement retrieved from the sensor.

First Embodiment

When the sensor is one of the one or more light detectors and the measurement data comprises light intensity values, the control unit may be configured to retrieve from said light detector a sequence of light intensity values, wherein each light intensity value corresponds to a laser pulse emitted from the laser device, or to an amplitude measurement conducted on continuously emitted laser light.

The control unit may be configured to shift the center of the cavity resonance wavelength range to a larger value if the most recent light intensity value was greater than the preceding light intensity value and if the most recent light intensity value was measured at a wavelength which is greater than the wavelength at which the preceding light intensity value was measured.

The control unit may be configured to shift the center of the cavity resonance wavelength range to a larger value if the most recent light intensity value was smaller than the preceding light intensity value and if the most recent light intensity value was measured at a wavelength which is smaller than the wavelength at which the preceding light intensity value was measured.

The control unit may be configured to shift the center of the cavity resonance wavelength range to a smaller value if the most recent light intensity value was greater than the preceding light intensity value and if the most recent light intensity value was measured at a wavelength which is smaller than the wavelength at which the preceding light intensity value was measured.

The control unit may be configured to shift the center of the cavity resonance wavelength range to a smaller value if the most recent light intensity value was smaller than the preceding light intensity value and if the most recent light intensity value was measured at a wavelength which is greater than the wavelength at which the preceding light intensity value was measured.

Figure 4:
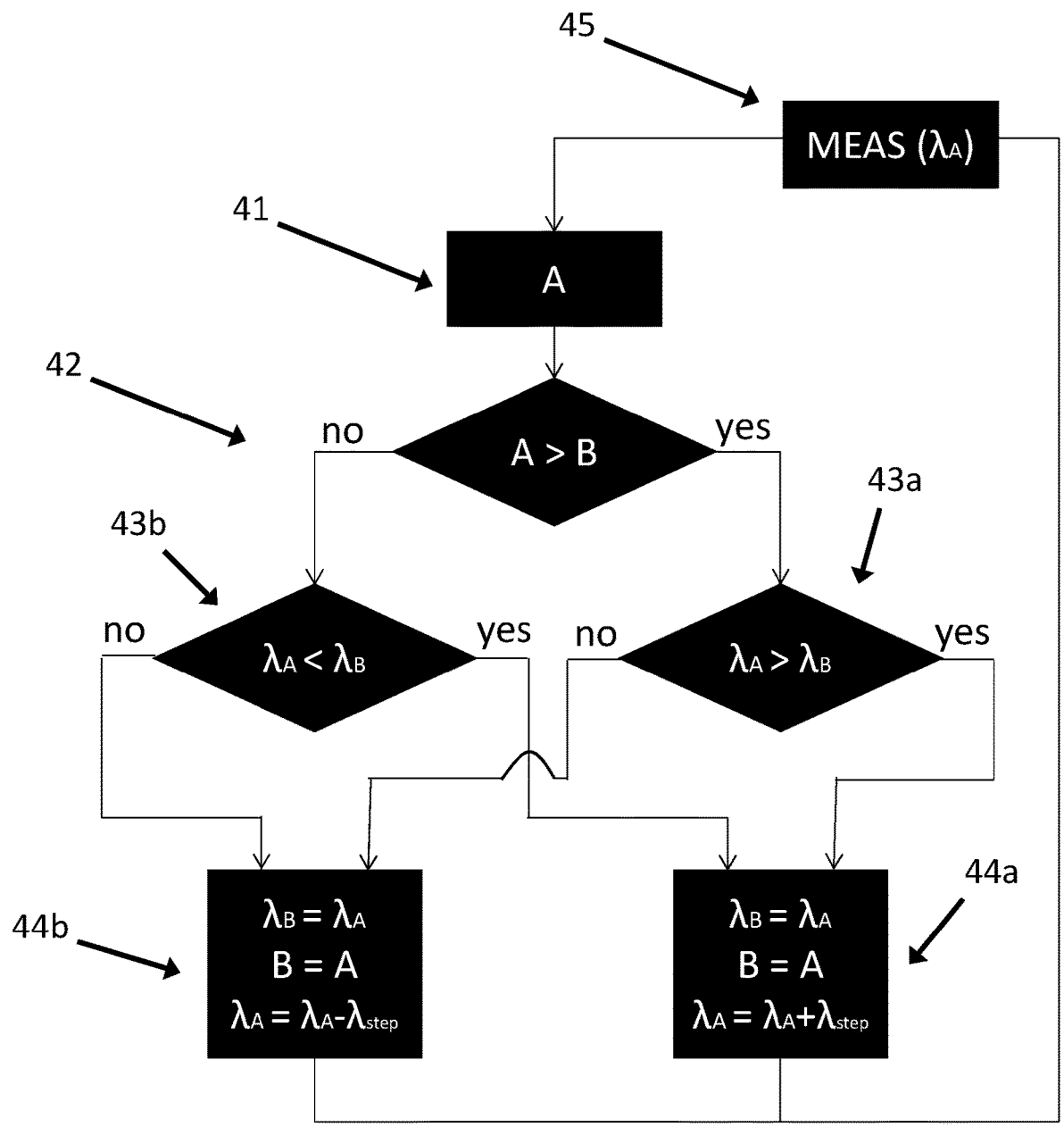
FIG. 4 illustrates a measurement method according to a first embodiment.

FIG. 4 illustrates the method employed by the control unit. An initial sweep may first be conducted with the Fabry-Pérot interferometer to find the laser peak. The cavity resonance wavelength range may initially be centered on an initial wavelength, and the initial light intensity value measured at this initial wavelength may be stored. Optionally, a temperature value retrieved from a temperature sensor configured to monitor the temperature of the laser device may be used to determine a suitable initial wavelength where the measurement cycle can begin. The control unit may be configured to find the tabulated laser wavelength value which corresponds to the retrieved temperature value, and this tabulated laser wavelength value may be stored as the initial wavelength where the cavity resonance wavelength range is centered.

In step 45, the control unit conducts a measurement of a new light intensity value at a wavelength $\lambda_A$. This value is here denoted with the letter A, and stored in a memory unit in step 41. A thereby becomes the most recent light intensity value. In step 42, the control unit compares A to the preceding light intensity value, which is here denoted with the letter B. When a measurement sequence begins, B may be set equal to the initial light intensity value, mentioned above. After one cycle of the loop illustrated in FIG. 4 has been completed, B will have the value which it was given in step 44, to be described below.

In FIG. 4, $\lambda_A$ signifies the center of the cavity resonance wavelength range (determined by the voltage applied to the scanning FPI) when the most recent measurement was conducted, and $\lambda_B$ signifies the center of the cavity resonance wavelength range when the preceding measurement was conducted. In steps 44a and 44b, the control unit sets up the next measurement. $\lambda_A$ is first stored in the memory unit as the new value of $\lambda_B$, and A is stored in the memory unit as the new value of B.

In the comparison in step 42, A>B indicates that the center of the cavity resonance wavelength range was closer to the laser wavelength when the most recent measurement was conducted than it was in the measurement which preceded it. On the other hand, A<B indicates that the center of the cavity resonance wavelength range was further from the wavelength when the most recent measurement was conducted than it was in the measurement which preceded it.

Therefore, if A>B and $\lambda_A > \lambda_B$ in comparison steps 42 and 43a, the center of the cavity resonance wavelength range should be shifted to a longer wavelength for the next measurement because $A_A$ is closer to the laser wavelength. The new value of $\lambda_A$ is therefore in step 44a calculated by incrementing $\lambda_A$ with a wavelength increment $\lambda_{step}$. In other words, the voltage applied to the scanning FPI is either increased or decreased so that center of the cavity resonance wavelength range is shifted by the increment $\lambda_{step}$. On the other hand, if A>B and $A_A < A_B$ in comparison steps 42 and 43a, then the center of the cavity resonance wavelength range should be shifted to a shorter wavelength for the next measurement. The new value of $\lambda_A$ is therefore in step 44b calculated by reducing $\lambda_A$ with the wavelength increment $\lambda_{step}$.

Similarly, if A<B and $\lambda_A < \lambda_B$ in comparison steps 42 and 43b, the center of the cavity resonance wavelength range should be shifted to a longer wavelength for the next measurement because $\lambda_B$ is closer to the laser wavelength. The new value of $\lambda_A$ is therefore in step 44a calculated by incrementing $\lambda_A$ with a wavelength increment $\lambda_{step}$. And if A<B and $\lambda_A > \lambda_B$ in comparison steps 42 and 43b, then the center of the cavity resonance wavelength range should be shifted to a shorter wavelength for the next measurement in step 44b.

After $\lambda_A$ has been assigned a new value in steps 44a and 44b, the measurement cycle again returns to step 45, where a new light intensity measurement is now conducted at the incremented or decreased wavelength value $\lambda_A$. By this method, the control unit can track the laser wavelength and make continuous adjustments to the voltage applied to the scanning FPI so that cavity resonance wavelength range remains centered very close to laser wavelength even as the temperature of the laser varies. No temperature calibration is needed.

As in the preceding embodiment, averaging may be employed when light intensity values are compared. In other words, the "most recent light intensity value" may be an average of a first set of light intensity measurements, and the "preceding light intensity value" may be an average of a second set of light intensity measurements so that the second set was measured before the first set.

Second Embodiment

When the sensor is one of the one or more light detectors and the measurement data comprises light intensity values, the control unit may be configured to retrieve from said light detector a sequence of light intensity values, wherein each light intensity value corresponds to a laser pulse emitted from the laser device, or to an amplitude measurement conducted on continuously emitted laser light.

The control unit may also be configured to monitor light intensity by comparing each retrieved light intensity value to one or more preceding light intensity values, and to keep the center of the cavity resonance wavelength range unchanged if the retrieved light intensity value falls within a predetermined margin from the one or more preceding light intensity values. The control unit may also be configured to shift the center of the cavity resonance wavelength range if the retrieved light intensity value falls outside of a predetermined margin from the one or more preceding light intensity values until a new retrieved light intensity value falls within a predetermined margin from the one or more preceding light intensity values.

The shift may be either upward to longer wavelengths, or downward to shorter wavelengths. After a new light intensity value is retrieved which falls within the desired margin, the control unit may keep the center of the cavity resonance wavelength range set at its new adjusted value and return to monitoring new retrieved light intensity values by comparing them to preceding light intensity values The control unit may be configured to store two light intensity values in two memory locations in a memory unit. The control unit may store the most recently retrieved light intensity value in a first memory location, and the preceding light intensity value in a second memory location. Each time a new light intensity value is retrieved, the value stored in the first memory location may be moved to the second memory location, so that the value which was initially in the second memory location is overwritten.

Alternatively, the control unit may be configured to store a longer sequence of preceding light intensity values in the memory unit. The most recently retrieved light intensity value may then be compared for example to an average or a weighted average of all the preceding light intensity values which have been stored in the memory unit. The average may for example be a sliding average where five or ten most recently recorded preceding light intensity values are included.

A suitable predetermined margin for triggering the adjustments outlined above may, for example, be that the retrieved light intensity value differs from the preceding light intensity value (or from the average of preceding light intensity values) by more than 1% or more than 5%.

Under the assumption that the emitted light intensity remains constant, a deviation between the retrieved light intensity value and the one or more preceding light intensity values which is larger than the predetermined margin indicates that the laser wavelength has shifted and that the cavity resonance wavelength range of the FPI is no longer optimally aligned with the laser wavelength.

The control unit may be configured to change the voltage applied to the FPI terminals so that the reflective surfaces of the FPI either move further apart or close to each other. The control unit may be configured to check whether the upper or lower bound of the predetermined margin was exceeded, and to adjust the voltage upward or downward accordingly. However, the adjustment can be automated even without this check, because if an adjustment is made in the wrong direction, this is quickly detected when a new light intensity value is retrieved. The control unit may be configured to make adjustments which increase retrieved light intensity values until such values which fall within the predetermined margin of the light intensity values which preceded the triggering of the adjustment are again retrieved.

The one or more light detectors may comprise a first light detector for measuring the travel time, and a second light detector for monitoring light intensity. In this case the first light detector can operate either in linear- or Geiger-mode if used only for travel time measurement, but the second light detector must operate in linear mode. Both detectors must be located so that the measured light power comes through the same optical aperture of the Fabry-Pérot filter-device.

Alternatively, the one or more light detectors may comprise only one first light detector for measuring the absorption time and for monitoring light intensity.

Figure 5:
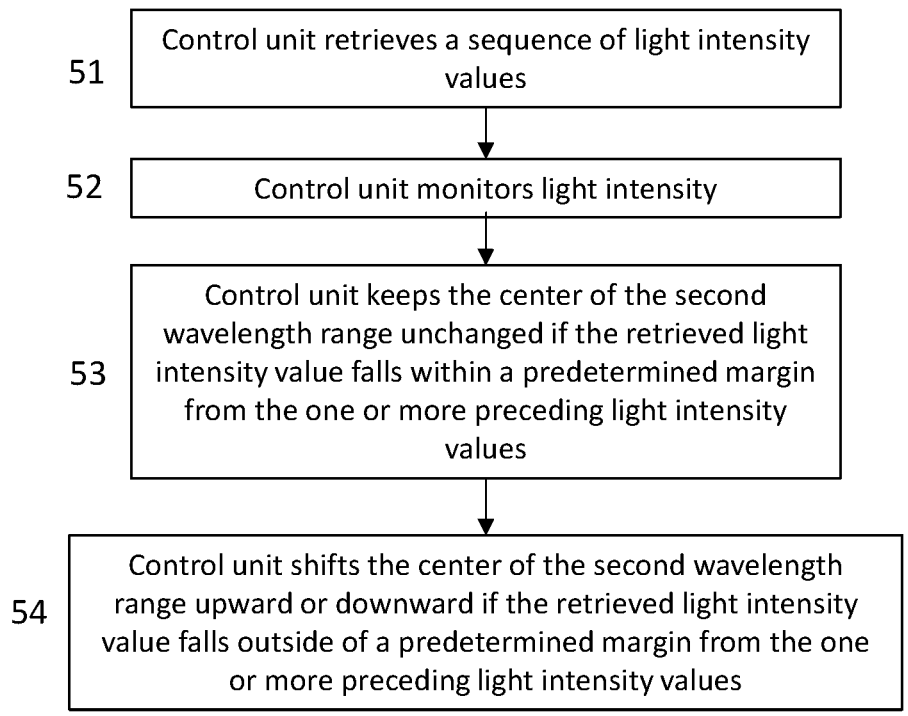
FIG. 5 illustrates a measurement method according to a second embodiment.

The corresponding method, performed with the same measurement arrangement, is illustrated in FIG. 5. The control unit retrieves from said light detector a sequence of light intensity values (51), wherein each light intensity value corresponds to laser light emitted from the laser device, and monitors light intensity (52) by comparing each retrieved light intensity value to one or more preceding light intensity values. The control unit also keeps the center of the cavity resonance wavelength range unchanged if the retrieved light intensity value falls within a predetermined margin from the one or more preceding light intensity values (53), and shifts the center of the cavity resonance wavelength range upward or downward if the retrieved light intensity value falls outside of a predetermined margin from the one or more preceding light intensity values (54).

As in the preceding embodiment, averaging may be employed when light intensity values are compared. In other words, the "retrieved light intensity value" may be an average of a first set of light intensity measurements, and the "preceding light intensity value" may be an average of a second set of light intensity measurements, so that the second set was measured before the first set.

Third Embodiment

When the sensor is a temperature sensor configured to measure the temperature of the laser device, and the measurement data comprises temperature values, the control unit may be configured to retrieve from said temperature sensor a temperature value, and retrieve from stored calibration data a tabulated laser wavelength value which corresponds to the retrieved temperature value. The control unit may also be configured to shift the center of the cavity resonance wavelength range to the tabulated laser wavelength value.

In other words, the control unit may be connected to a temperature sensor which monitors the temperature of the laser device 24. The temperature-dependence of the wavelengths of the laser light emitted from the laser device may have been determined in calibration experiments before or after the device was put to use. The tabulated calibration data obtained from such experiments may then be utilized for determining the current value of the laser wavelength at any time based on a direct temperature measurement.

Based on a retrieved temperature value, the control unit may find the tabulated laser wavelength value which corresponds to the retrieved temperature value. The control unit may also be configured to change the voltage applied to the FPI control terminals, so that the reflective surfaces of the FPI are moved in relation to each other if the tabulated laser wavelength value differs from the current center point of the cavity resonance wavelength range. The cavity resonance wavelength range of the FPI thereby remains aligned with the wavelength of emitted laser light even if the temperature of the laser device changes.

After the adjustment has been made, the control unit may keep the center of the cavity resonance wavelength range set at its new adjusted value and return to monitoring new retrieved light intensity values by comparing them to preceding light intensity values.

Figure 6:
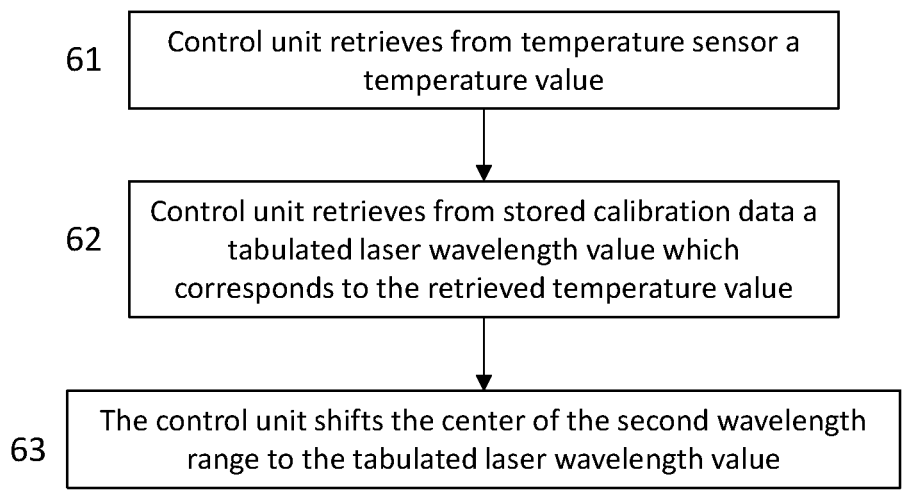
FIG. 6 illustrates a measurement method according to a third embodiment.

The corresponding method, performed with the same measurement arrangement, is illustrated in FIG. 6. The control unit retrieves from said temperature sensor a temperature value (61), and retrieves from stored calibration data a tabulated laser wavelength value which corresponds to the retrieved temperature value (62), and shifts the center of the cavity resonance wavelength range to the tabulated laser wavelength value (63).

The invention claimed is:

1. A measurement arrangement for measuring a travel time of a laser beam, comprising
    a laser device configured to emit laser light with a laser wavelength toward a surrounding environment,
    one or more light detectors configured to absorb inbound laser light after it has been reflected back towards the measurement arrangement from an object in the surrounding environment,
    a control unit configured to calculate the travel time either by recording the emission time of sequential laser pulses at the laser device and the absorption time of each laser pulse at the one or more light detectors, or by determining the phase-shift of continuous-wave laser light between emission and absorption,
    an order-sorting filter configured to transmit laser light only in a first wavelength range, and a scanning Fabry-Pérot interferometer configured to transmit laser light only in a cavity resonance wavelength range, wherein the first wavelength range is broader than the cavity resonance wavelength range, and
    a voltage source connected to the scanning Fabry-Pérot interferometer, so that the cavity resonance wavelength range can be changed by altering the voltage applied to the scanning Fabry-Pérot interferometer,
    wherein the control unit is configured to retrieve from a sensor measurement data relating to the laser wavelength of the laser light emitted by the laser device, and to shift the center of the cavity resonance wavelength range based on the retrieved sensor measurement data by altering the voltage applied to the scanning Fabry-Pérot interferometer, and
    wherein the sensor is a light detector and the sensor measurement data is a wavelength measurement conducted on light which has been reflected, scattered, or passed through a beam splitter inside a casing of the laser device, but has not been reflected back from the surrounding environment.

2. The measurement arrangement according to claim 1, wherein the sensor is one of the one or more light detectors, the measurement data comprises light intensity values, and that the control unit is configured to
    retrieve from said light detector a sequence of light intensity values, wherein each light intensity value corresponds to laser light emitted from the laser device, and
    shift the center of the cavity resonance wavelength range to a larger value if the most recent light intensity value was greater than the preceding light intensity value and if the most recent light intensity value was measured at a wavelength which is greater than the wavelength at which the preceding light intensity value was measured, or
    shift the center of the cavity resonance wavelength range to a larger value if the most recent light intensity value was smaller than the preceding light intensity value and if the most recent light intensity value was measured at a wavelength which is smaller than the wavelength at which the preceding light intensity value was measured, or
    shift the center of the cavity resonance wavelength range to a smaller value if the most recent light intensity value was greater than the preceding light intensity value and if the most recent light intensity value was measured at a wavelength which is smaller than the wavelength at which the preceding light intensity value was measured, or shift the center of the cavity resonance wavelength range to a smaller value if the most recent light intensity value was smaller than the preceding light intensity value and if the most recent light intensity value was measured at a wavelength which is greater than the wavelength at which the preceding light intensity value was measured.

3. The measurement arrangement according to claim 1, wherein the sensor is one of the one or more light detectors, the measurement data comprises light intensity values, and that the control unit is configured to retrieve from said light detector a sequence of light intensity values, wherein each light intensity value corresponds to laser light emitted from the laser device, and monitor light intensity by comparing each retrieved light intensity value to one or more preceding light intensity values, and to keep the center of the cavity resonance wavelength range unchanged if the retrieved light intensity value falls within a predetermined margin from the one or more preceding light intensity values, and to shift the center of the cavity resonance wavelength range if the retrieved light intensity value falls outside of a predetermined margin from the one or more preceding light intensity values until a new retrieved light intensity value falls within a predetermined margin from the one or more preceding light intensity values.

4. The measurement arrangement according to claim 2, wherein the one or more light detectors comprise a first light detector for measuring the absorption time, and a second light detector for monitoring light intensity.

5. The measurement arrangement according to claim 2, wherein the one or more light detectors comprise only one first light detector for measuring the travel time and for monitoring light intensity.

6. The measurement arrangement according to claim 1, wherein the sensor is a temperature sensor configured to measure the temperature of the laser device, the measurement data comprises temperature values, and that the control unit is configured to retrieve from said temperature sensor a temperature value, and retrieve from stored calibration data a tabulated laser wavelength value which corresponds to the retrieved temperature value, and shift the center of the cavity resonance wavelength range to the tabulated laser wavelength value.

7. The measurement arrangement according to claim 1, wherein a light path from the object in the surrounding environment to the one or more light detectors comprises reflection at the first scanning reflector.

8. A method for measuring a travel time of a pulsed laser beam, comprising:

emitting, by a laser device, laser light with a laser wavelength toward a surrounding environment, absorbing, by one or more light detectors, inbound laser light after it has been reflected back towards a measurement arrangement from an object in the surrounding environment, and calculating, by a control unit, the travel time either by recording an emission time of sequential laser pulses at the laser device and an absorption time of each laser pulse at the one or more light detectors, or by determining the phase-shift of continuous-wave laser light between emission and absorption, wherein first an order-sorting filter is disposed and configured to transmit laser light only in a first wavelength range, and then a scanning Fabry-Pérot interferometer is disposed and configured to transmit laser light only in a cavity resonance wavelength range, wherein the first wavelength range is broader than the cavity resonance wavelength range, wherein a voltage source is connected to the scanning Fabry-Pérot interferometer, so that the cavity resonance wavelength range can be changed by altering the voltage applied to the scanning Fabry-Pérot interferometer, wherein the control unit retrieves from a sensor measurement data relating to the laser wavelength of the laser light emitted by the laser device, and shifts the center of the cavity resonance wavelength range based on the retrieved measurement data by altering the voltage applied to the scanning Fabry-Pérot interferometer, and wherein the sensor is a light detector and the sensor measurement data is a wavelength measurement conducted on light which has been reflected, scattered, or passed through a beam splitter inside a casing of the laser device, but has not been reflected back from the surrounding environment.

9. The method according to claim 8, wherein the sensor is one of the one or more light detectors, the measurement data comprises light intensity values, and that the control unit retrieves from said light detector a sequence of light intensity values, wherein each light intensity value corresponds to laser light emitted from the laser device, and shifts the center of the cavity resonance wavelength range to a larger value if the most recent light intensity value was greater than the preceding light intensity value and if the most recent light intensity value was measured at a wavelength which is greater than the wavelength at which the preceding light intensity value was measured, or shifts the center of the cavity resonance wavelength range to a larger value if the most recent light intensity value was smaller than the preceding light intensity value and if the most recent light intensity value was measured at a wavelength which is smaller than the wavelength at which the preceding light intensity value was measured, or shifts the center of the cavity resonance wavelength range to a smaller value if the most recent light intensity value was greater than the preceding light intensity value and if the most recent light intensity value was measured at a wavelength which is smaller than the wavelength at which the preceding light intensity value was measured, or shifts the center of the cavity resonance wavelength range to a smaller value if the most recent light intensity value was smaller than the preceding light intensity value and if the most recent light intensity value was measured at a wavelength which is greater than the wavelength at which the preceding light intensity value was measured.

10. The method according to claim 8, wherein the sensor is one of the one or more light detectors, the measurement data comprises light intensity values, and that the control unit retrieves from said light detector a sequence of light intensity values, wherein each light intensity value corresponds to laser light emitted from the laser device, monitors light intensity by comparing each retrieved light intensity value to one or more preceding light intensity values, and keeps the center of the cavity resonance wavelength range unchanged if the retrieved light intensity value falls within a predetermined margin from the one or more preceding light intensity values, and shifts the center of the cavity resonance wavelength range if the retrieved light intensity value falls outside of a predetermined margin from the one or more preceding light intensity values, until a new retrieved light intensity value falls within a predetermined margin from the one or more preceding light intensity values.

11. The method according to claim 8, wherein the sensor is a temperature sensor configured to measure the temperature of the laser device, the measurement data comprises temperature values, and that the control unit retrieves from said temperature sensor a temperature value, and retrieves from stored calibration data a tabulated laser wavelength value which corresponds to the retrieved temperature value, and shifts the center of the cavity resonance wavelength range to the tabulated laser wavelength value.

* * * * *